United States Patent

Volker et al.

[11] Patent Number: 5,855,350
[45] Date of Patent: Jan. 5, 1999

[54] SEAT TRACK ASSEMBLY

[75] Inventors: Otto Volker, Rochelle; Ruben Hernandez, Belvedere; Thomas W. Paisley, Warren; Roger L. Brock, Roscoe, all of Ill.

[73] Assignee: Excel Industries, Inc., Elkhart, Ind.

[21] Appl. No.: 725,605

[22] Filed: Oct. 3, 1996

[51] Int. Cl.⁶ .................................................. F16M 13/00
[52] U.S. Cl. ................................................................ 248/430
[58] Field of Search .................... 248/430, 429, 248/424

[56] References Cited

U.S. PATENT DOCUMENTS

| | | | |
|---|---|---|---|
| 2,886,095 | 5/1959 | Heyl | 155/14 |
| 2,970,015 | 1/1961 | Ragsdale | 308/6 |
| 3,278,737 | 10/1966 | Krause | 248/430 |
| 3,479,099 | 11/1969 | Krause | 308/3 |
| 3,944,302 | 3/1976 | Fourrey | 248/430 |
| 4,072,347 | 2/1978 | Boisset | 297/385 |
| 4,089,500 | 5/1978 | Gustafsson | 248/429 |
| 4,204,658 | 5/1980 | Courtois | 248/430 |
| 4,511,187 | 4/1985 | Rees | 308/3.8 |
| 4,563,044 | 1/1986 | Rees | 308/3.8 |
| 4,863,289 | 9/1989 | Lecerf | 384/47 |
| 4,892,282 | 1/1990 | Suzuki et al. | 248/430 |
| 4,901,421 | 2/1990 | Takarabe et al. | 248/430 |
| 4,941,637 | 7/1990 | Pipon | 248/430 |
| 5,046,698 | 9/1991 | Venier | 248/430 |
| 5,076,530 | 12/1991 | Dove et al. | 248/430 |
| 5,222,814 | 6/1993 | Boelryk | 384/47 |
| 5,224,781 | 7/1993 | Rohee | 384/34 |
| 5,286,076 | 2/1994 | DeVoss et al. | 248/430 |
| 5,358,207 | 10/1994 | West | 248/430 |
| 5,370,350 | 12/1994 | Okano et al. | 248/430 |
| 5,531,503 | 7/1996 | Hughes | 297/341 |

FOREIGN PATENT DOCUMENTS

| | | |
|---|---|---|
| 0582773A1 | 2/1993 | European Pat. Off. . |
| 2445779 | 1/1978 | France . |
| 2514305 | 10/1981 | France . |

*Primary Examiner*—Ramon O. Ramirez
*Assistant Examiner*—Anita M. King
*Attorney, Agent, or Firm*—Banner & Witcoff Ltd

[57] ABSTRACT

A rollerless seat track assembly and a motor vehicle seat having a rollerless seat track assembly is shown having a lower track mounted to a base or floor of a motor vehicle, and a slidable upper track attached to a seat base. The upper track has a top wall and a pair of side walls. The lower track has a pair of flanges positioned adjacent a primary load bearing contact surface. Preferably a low friction coating, such as a PTFE epoxy paint is applied to the primary load bearing contact surface of the lower track, and a preferably elongate glide strip or glide member may be affixed to a lower side of the top wall of the upper track. As the seat track slides back and forth, the glide strip would slide over the low friction coating, minimizing the efforts required to adjust the seat. Lateral stability may be enhanced by lateral stabilization ball bearings running in raceways between the upper and lower tracks. Preferably a swizel stick or retainer having a series of openings sized to receive the ball bearings is positioned in each raceway to maintain proper spacing of the ball bearings. Optionally the raceway may have four contact points with each ball bearing. The tracks may be interlocking, that is, capable of resisting upward dislocation forces.

35 Claims, 5 Drawing Sheets

SEAT TRACK ASSEMBLY

FIELD OF THE INVENTION

The present invention generally relates to mechanisms allowing for seats to slide relative a fixed member, and more particularly to improved seat track assemblies for fore and aft adjustment of seats in a motor vehicle.

BACKGROUND OF THE INVENTION

Seats in a motor vehicle are often at least adjustable in fore and aft directions (that is, towards the front and rear of the motor vehicle) by a seat track assembly. A lower seat track is affixed to the floor of the motor vehicle, either directly or mounted on a riser or other mounting assembly. An upper seat track is affixed to the underside of the vehicle seat, directly to a base of the seat or to an angled seat pan. The seat pan and the seat risers, where employed, allow the seat to be positioned at an angle and a height deemed most suitable for an occupant of the motor vehicle. For the front seats of a motor vehicle, typically two seat track assemblies are employed, one along each side of the seat base.

In seat track assemblies, frictional forces between the tracks must be minimized to allow position adjustment with acceptable efforts. U.S. Pat. No. 2,886,095 to Heyl shows a seat track assembly having an upper track sliding over a lower track. A pair of low friction washers is attached to rivets affixed to the upper track. The rivets slide back and forth in slots in the lower track, and the low friction washers slide over the lower track on the edges of the slots. Problems with this design include travel distance limited to the length of the slot and the potential for unacceptably high friction forces as the load is concentrated on the pair of washers. Moreover, the acceptable weight that can be placed on the seat track assembly may be restricted, since the load of the seat and any occupant in the seat all travels on the lower track which is weakened by the slot running down its middle. Additionally, wobbling of the seat may occur unless additional provision is made for lateral stabilization of the upper seat track relative to the lower seat track.

A more modern and structurally robust design is shown in U.S. Pat. No. 5,076,530 to Dove et al in which an upper track slides over a lower track on a pair of rollers positioned in a channel defined by the lower track. The rollers act as principal load bearing elements, and ball bearing positioned on either side of the rollers between flanges of the lower track and walls of the upper track serve to provide lateral stability to the upper seat track.

It would be desirable to eliminate the need for rollers while maintaining low friction forces when the upper track slides over the lower track, as the rollers add weight, cost and complexity. Moreover, rollers require grease or a similar lubricant, with the additional requirement that the design be modified to shroud the parts to prevent the occupant of a motor vehicle from contacting the grease. Rollers produce some noise and OEM automobile manufacturers are becoming increasingly stringent in their noise requirements. In addition, the rollers occupy space in the motor vehicle that could be saved or better used as a mounting location for the lower seat tracks and/or the lower seat tracks.

In view of the foregoing, it is an object of the present invention to provide a seat track assembly for use in a motor vehicle seat to provide for at least fore and aft adjustment of the seat, that is of a robust, low friction design and reduces noise during operation.

It is an additional object of the present invention to provide, at least in preferred embodiments, a seat track assembly that allows optimization in the mounting of the lower seat track to the motor vehicle.

It is an additional object of the present invention, at least in preferred embodiments, to provide a seat track assembly of reduced cost and complexity while enhancing manufacturability.

It is an additional object of the present invention, at least in preferred embodiments, to provide a seat track assembly that does not require the use of a grease to maintain low frictional forces between the tracks.

It is an additional object of the present invention, at least in preferred embodiments, to provide a seat having a rollerless, low friction seat track assembly.

It is yet another related object of the present invention to provide such a seat track assembly that is highly reliable in operation.

SUMMARY OF THE INVENTION

In accordance with these and other objects, there is provided a seat track assembly for slidable fore and aft adjustment of a seat having an upper seat track slidable over a lower seat track. The lower seat track may be affixed directly to the floor of the motor vehicle, or indirectly by a floor riser or floor mounting assembly. The upper track may preferably be attached to a seat pan or riser, or directly attached to the seat. The upper track has a bearing wall, typically a top wall and first and second side walls positioned on each side of the top wall and extending downward. A low friction glide strip is affixed to a lower side of the bearing wall. Preferably the glide strip is elongate and runs at least most of the length of the upper track. The lower track may preferably have a bottom wall, and interior side walls spaced laterally on either side of the bottom wall and extending upward to a load bearing surface. In a highly advantageous feature, a low friction coating, for example, a teflon impregnated epoxy paint, is applied to at least the load bearing surface of the lower track. The glide strip slides over the low friction coating on the contact surface. Frictional forces generated between the glide strip and the low friction coating are low enough in preferred embodiments to eliminate the need for traditional rollers and lubricants.

It is highly advantageous to provide lateral stability to the seat track assembly with rolling elements such as ball bearings traveling in raceways defined by the upper and lower tracks. One-half of a first raceway is defined by the side walls and flanges of a groove running in the first side wall of the upper track, the other half is defined by a groove running in the first flange in the lower track. A corresponding raceway is created by grooves in the second wall and second flange, respectively. Preferably the longitudinal spacing between the rolling elements is maintained by retainers, or so-called swizel sticks having openings corresponding to each rolling element.

In accordance with a second aspect, a seat track assembly allows for fore and aft adjustment of a seat in a motor vehicle, wherein the seat track assembly has a fixed track affixed to the motor vehicle and a slidable track affixed to the seat and slidable on the fixed track. The assembly advantageously withstands the weight of the seat and any additional weight, such as an occupant of the seat. The load bearing assembly comprises a low friction contact surface on the fixed track and an elongate plastic glide strip affixed to the slidable track. The elongate glide strip preferably extends substantially the entire length of the slidable track. A lateral stabilization assembly prevents or restricts lateral displacement and tipping of the slidable track and the seat, and preferably comprises rolling elements positioned in lateral raceways formed by the sidewalls and flanges of the fixed track and the slidable track.

In accordance with a third aspect, a seat is provided with at least one seat track assembly. For a front seat of a motor vehicle, two fore and aft running seat track assemblies are spaced laterally apart to enhance the stability of the seat. The seat has a seat back and a seat base, and the seat base preferably has a seat cushion and a seat pan. The seat track assemblies each has an upper track and a lower track. The upper tracks are preferably affixed to the seat pan. An elongate glide strip is sandwiched between the upper and lower tracks and each lower track has a low friction contact surface that the glide strip slides over when the seat is being adjusted.

A latch is attached to the upper track and is moveable by a so-called towel bar or other suitable mechanism, from a locking or latching position restricting travel of the upper track relative the lower track to a non-locking or non-latching position wherein the upper track can slide relative the lower track.

From the foregoing disclosure and the following more detailed description of various preferred embodiments it will be apparent to those skilled in the art that the present invention provides a significant advance in the technology and art of seat track assemblies. Particularly significant in this regard is the potential the invention affords for reduced or minimized frictional forces while reducing cost, operating noise, manufacturing steps and complexity. Additional features and advantages of various preferred embodiments will be better understood in view of the detailed description provided below.

It should be understood that the appended drawings are not necessarily to scale, presenting a somewhat simplified representation of various preferred features illustrative of the basic principles of the invention. The specific design features of a rollerless seat track assembly as disclosed here, including, for example, the cross sectional thickness of the tracks, the specific dimensions of the elongate glide strip and the low friction coating will be determined in part by the particular intended application and use environment. Certain features of the illustrated embodiments have been enlarged or distorted relative to others to facilitate visualization and clear understanding. In particular, thin features may be thickened, for clarity of illustration, as for example the low friction coating applied to the lower track. All references to direction and position, unless otherwise indicated, refer to the orientation of the set track assembly device illustrated in the drawings. In general, lateral or laterally refers to a rightward or leftward direction in the plane of the paper in the cross sectional view of FIG. 3, and up, down or vertical refers to corresponding up, down and vertical directions in the plane of the paper in FIG. 3.

DETAILED DESCRIPTION OF CERTAIN PREFERRED EMBODIMENTS

It will be apparent to those skilled in the art, that is, to those who have knowledge or experience in this area of technology, that many uses and design variations are possible for the seat track assemblies disclosed herein. The following detailed discussion of various alternative and preferred features and embodiments will illustrate the general principles of the invention with reference to a seat track assembly suitable for use in a motor vehicle. Other embodiments suitable for other applications will be apparent given the benefit of this disclosure.

Figure 1:
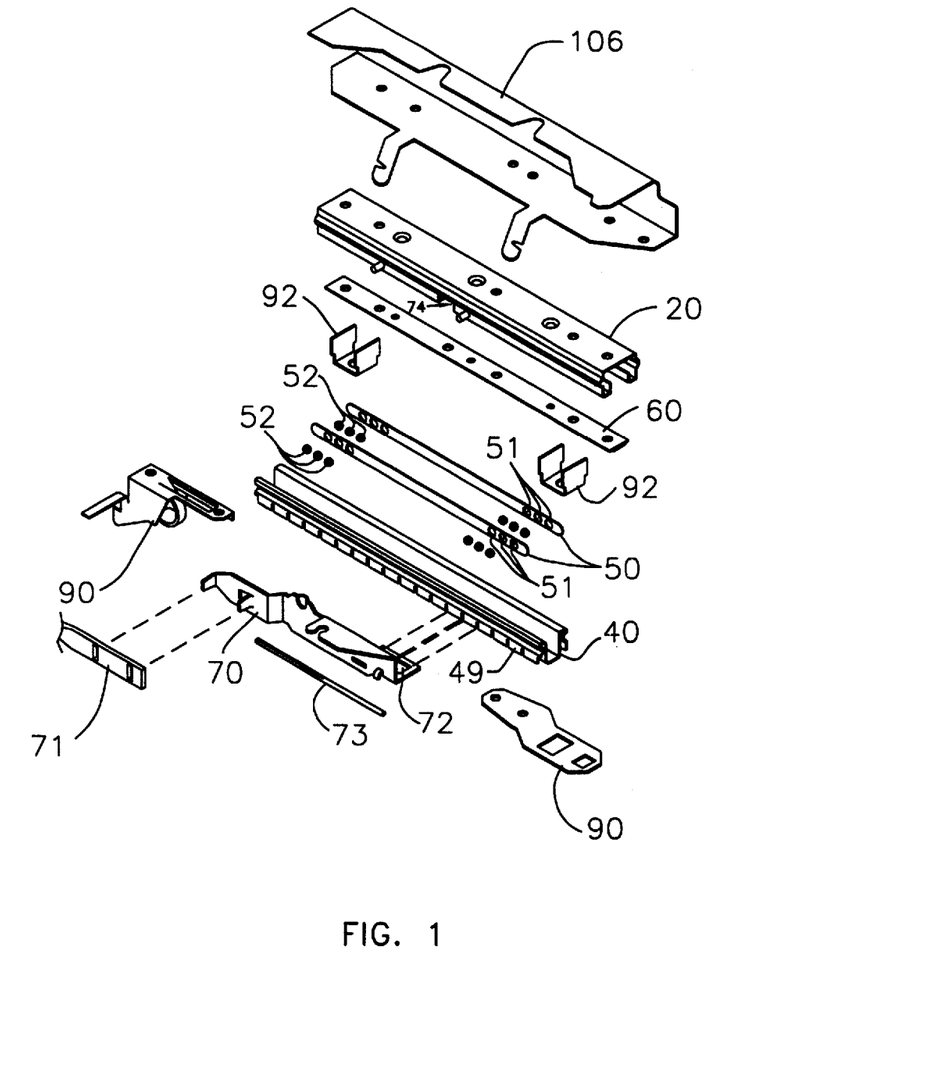
FIG. 1 is an exploded perspective view of a preferred embodiment of a seat track assembly.
Figure 2:
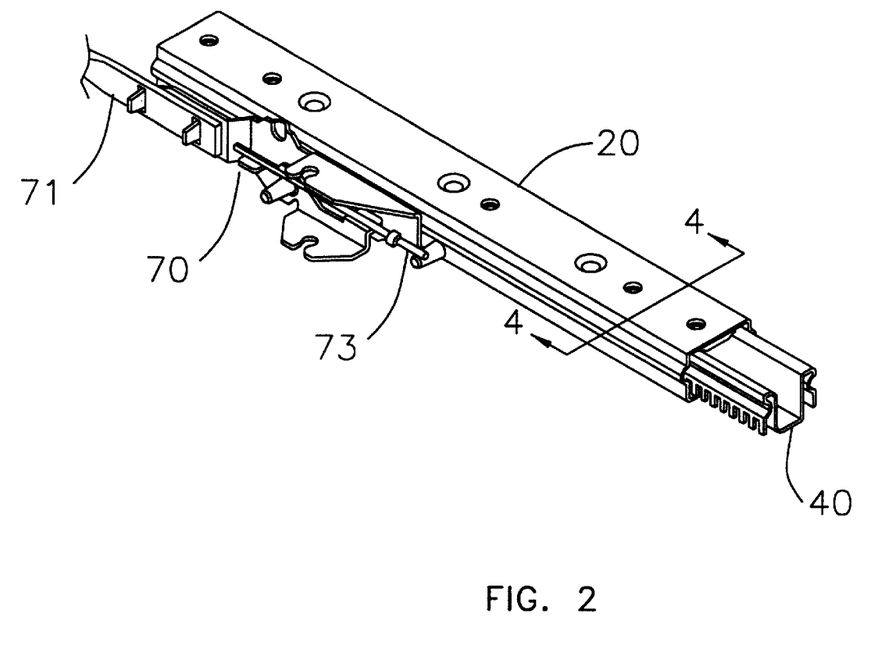
FIG. 2 is a perspective view of a seat track assembly showing the upper track moved over part of its travel distance to reveal the lower track.

Referring now to the drawings, FIG. 1 is an exploded perspective view of a preferred embodiment of a seat track assembly 10 for slidable fore and aft adjustment of a seat. The seat track assembly 10 is seen to comprise a slidable upper track 20 sliding on a fixed lower track 40. FIG. 2 shows the upper track having slid over a part of its travel distance to reveal the lower track that it slides over. The upper track 20 can be directly attached to a vehicle seat, or indirectly attached to a seat pan or riser 106. The lower track can be affixed to the motor vehicle, either directly to the floor of the motor vehicle or indirectly by a floor riser or floor mounting assembly 90. The floor mounting assembly 90 and the seat riser 106, where employed, allow the seat to be raised off the floor of the motor vehicle and positioned at what is deemed to be an ergonomically desirable height and angle.

Figure 3:
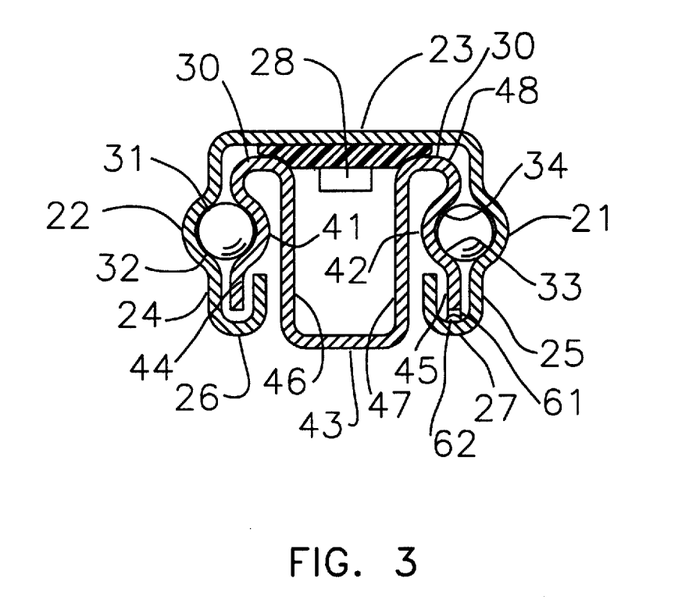
FIG. 3 is a cross sectional view of the seat track assembly taken along the line 4—4 in FIG. 2 showing the preferred four point contact on the lateral stabilization rolling elements.

FIG. 3 shows a cross sectional view of the seat track assembly 10. The upper track 20 preferably has a bearing wall, specifically top wall 23, and first and second side walls 24, 25. The top wall 23 is preferably generally horizontal or parallel to the plane of the floor of the motor vehicle, and the side walls 24,25 preferably are generally vertical or perpendicular to the top wall. Preferably the upper track is roll formed and subjected to an autoferretic dip to resist corrosion.

The lower track 40, also preferably roll formed, is shown to have a bottom wall 43 and interior walls 46, 47 extending from the bottom wall 43, leading to a primary load bearing contact surface 30. Preferably the contact surface 30 has been prepared to minimize sliding friction. In a highly advantageous feature a low friction coating 48, such as a polytetrafluoroethene loaded or impregnated paint (PTFE) is applied to at least the contact surface 30 of the lower track. The paint may be applied by an electrostatic spray, for example, to a thickness in the range of 0.013 to 0.018 mm. To enhance bonding of the paint to the lower track, a pre-cleaning operation may be applied to the roll formed tracks which includes application of a phosphate pre-coat. Alternative low friction coatings, such as PTFE impregnated adhesive tape, may also be employed.

A glide strip 60 is affixed by glider mount tabs 28 to a lower side of the top wall 23 of the upper track. The glide strip 60 is preferably made of a lubristic plastic, such as nylon. Preferably the glide strip is elongate, that is, it runs at least nearly the entire length of the upper track 20, e.g., at least half its length, more preferably at least two-thirds the length of the top wall 23, most preferably its entire length.

It is highly desirable for principal load bearing to be received through the glide strip 60 over the low friction contact surface 30 of the lower track 40 rather than through the upper track directly; therefore in the preferred embodiment shown best in FIG. 2, the elongate glide strip 60 is essentially the same length as the upper track 20. During normal operation of the seat track assembly, the glide strip 60 slides over the low friction coating 48 on the load bearing surface 30. Load bearing rollers centrally positioned between upper track and the lower track are eliminated and the frictional forces are low enough that grease or other similar lubricants need not be used. Elimination of rollers allows the lower track to be bolted to the motor vehicle anywhere along the bottom wall, instead of outside the travel path of the rollers. Thus the elimination of rollers allows for a compact lower track that reduces overall weight.

To minimize flexing or warping of the seat track assembly, a pair of U-shaped stabilizing brackets 92 may be positioned to a top surface of the bottom wall 43 of the lower track 40. To control lateral motion of the upper track relative the lower track, a lateral stabilization assembly is provided comprising rolling elements such as ball bearings 52 positioned between the upper track and the lower track. More specifically, a series of lateral stabilization ball bearings 52 may preferably be positioned on either side of the seat track assembly. One series of ball bearings are positioned in a raceway defined by a ball bearing receiving groove 22 formed by the first side wall of the upper track and a ball bearing receiving groove 41 formed by the first flange 44 of the lower track; the other series of ball bearings are positioned on the opposite side of the seat track assembly in a raceway defined by a ball bearing receiving groove 21 formed by the second side wall 25 of the upper track and a ball bearing receiving groove 42 formed by the second flange 45 of the lower track.

To maintain the ball bearings in each raceway at a fixed distance from one another an elongate retainer 50, also less formally referred to as a swizel stick, is provided in each raceway, having openings 51 sized to receive the rolling elements. Where the rolling elements are ball bearings, preferably 6 plastic ball bearings are located in each raceway. Where the rolling elements are ball bearings, each ball bearing receiving groove on each track may preferably contact the ball bearings at two points, to provide for what is known as four-point contact 31,32,33,34. Four point contact is preferable to optimize lateral and vertical stability and minimize deflection of the seat tracks 20,40.

In the embodiment shown in FIGS. 1–4, the ball bearings are preferably spaced away from the top wall 23 of the upper track 20 and from the contact surface 30 of the lower track. That is, the ball bearings do not contact either the glide strip or the contact surface. In this embodiment, the ball bearings serve principally as lateral and vertical stabilizers.

The seat tracks may optionally have an interlocking feature, preventing upward dislocation forces from separating the upper and lower tracks. Extending from the first and second side walls 24,25 of the upper track 20 are J hooks or J-shaped extensions 26,27 preferably extending laterally in opposite directions toward one another. The first and second flanges of the lower track extend into the corresponding J-hook permitting sliding motion during normal operation and normal loading on the seat track assembly and resist upward separation forces to limit vertical dislocation of the upper track relative the lower track.

A positive stop may be used to restrict the travel path of the upper track in each direction. The upper track 20 has first and second projections 61 positioned generally near each end of the upper track, which may be tabs, lances, stop pins or other suitable positive stop members. The upper track slides forward until a first projection contacts a lower track projection 62. The upper track slides rearward until the second projection contacts the other end of the lower track projection 62.

Figure 4:
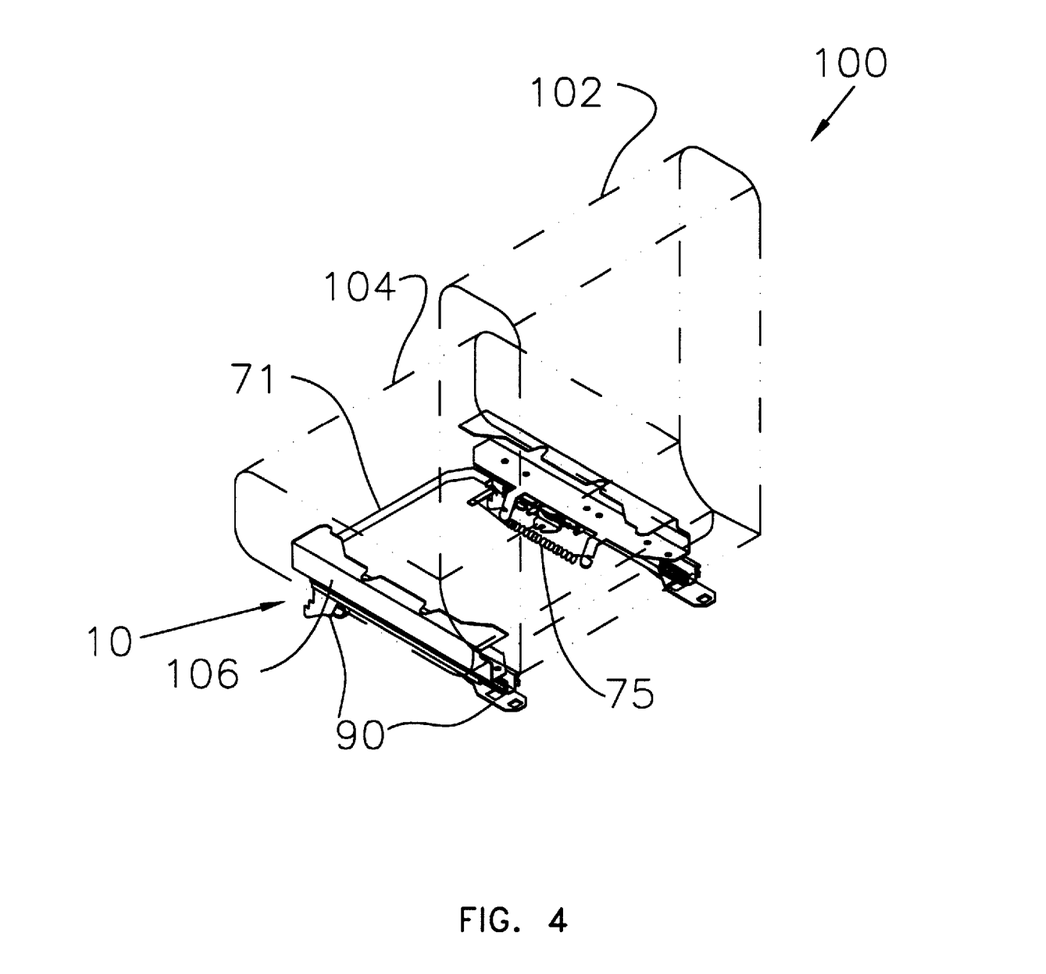
FIG. 4 is a perspective view of a preferred embodiment of a seat track assembly mounted on a seat for slidable adjustment of the seat with a seat base cut away to reveal the seat track assembly exemplifying the practice of the present invention.

As shown in FIG. 4, for motor vehicle seats 100 using seat track assemblies described above, normally the seat 100 has a seat back 102 pivotally attached to a seat base, and the seat base comprises a seat cushion 104 and a seat pan or riser 106, and the upper track is affixed to the seat pan. Preferably two seat track assemblies 10 are used, with each seat track assembly spaced laterally apart to provide stability to the seat 100.

The upper seat track 20 may be secured to the lower track 40 by a latch 70. The upper seat track has a window 74 allowing the latch to contact the lower track. The lower track has a series of teeth 49 extending from the end of the first and second flanges 44,45. The latch preferably has latch windows 72 sized to receive the teeth 49 of the lower track 40 when the latch is in the locking or latching position. Preferably the latch 70 is pivotable and a spring 73 normally biases the latch into latching engagement with the lower track. Operation of a towel bar 71 or other suitable mechanism, as shown in FIG. 4, overcomes the force of the spring to move the latch out of engagement with the lower track and allow an operator to slide his seat to a comfortable location. Optionally a spring 75 may be at one end to the seat track assembly and at the other end to the motor vehicle or other fixed location to bias the seat towards the full forward position when the latch 70 is disengaged.

Figure 5:
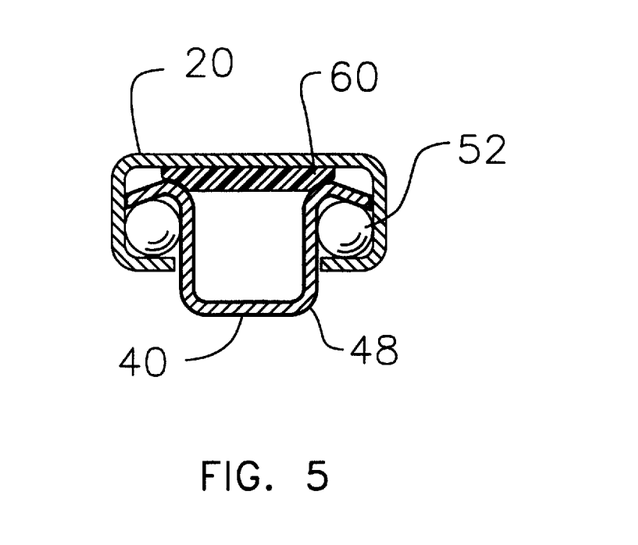
FIG. 5 is a cross sectional view of an additional alternative embodiment of a seat track assembly where an interlocking feature is not required.
Figure 6:
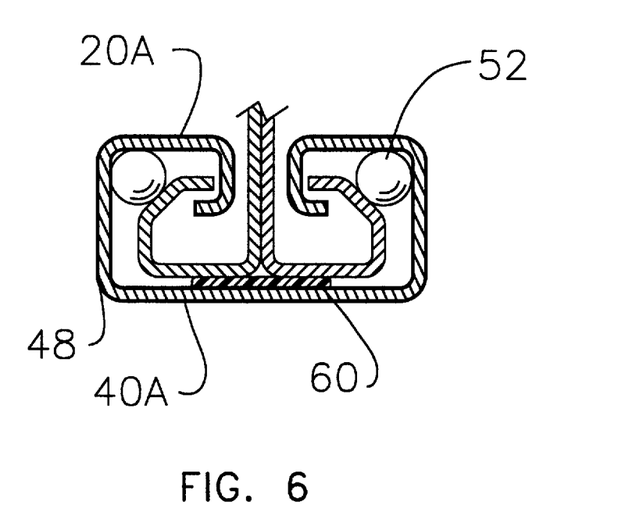
FIG. 6 is a cross sectional view of an alternative embodiment of a rollerless seat track assembly, revealing a double-J shaped upper track.

FIG. 5 reveals an alternative embodiment of the invention wherein an interlocking feature is not used on the seat tracks. FIG. 6 reveals a "double J" design incorporation for the upper track 20A, with a modified lower track 40A and location for lateral stabilization ball bearings.

From the foregoing disclosure and detailed description of certain preferred embodiments, it will be apparent that various modifications, additions and other alternative embodiments are possible without departing from the true scope and spirit of the invention. For example, seat track assemblies as disclosed above may be used on seats adjustable in more directions that just forward and backward; four-way and six-way adjustable seats, both manual and power controlled, may use such seat track assemblies. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A seat track assembly for slidably adjusting a seat, comprising, in combination:

an upper track having an elongate bearing top wall and first and second laterally spaced side walls extending along and downwardly from the top wall;

a lower track having a primary load bearing, elongate contact surface and a first flange and a second flange positioned adjacent the contact surface;

at least one lateral stabilization ball bearing positioned between the first flange of the lower track and the corresponding first side wall of the upper track, and at least one lateral stabilization ball bearing positioned between the second flange of the lower track and the corresponding second wall of the upper track; and a glide member attached to the top wall and slidably bearing on the contact surface of the lower track.

2. The seat track assembly of claim 1 wherein the lateral stabilization ball bearings are slidable between the flanges of the lower track and the corresponding walls of the upper track.

3. The seat track assembly of claim 1 wherein the first and second side walls of the upper track have corresponding first and second upper track grooves, the first and second flanges of the lower track have corresponding first and second lower track grooves, and the upper track grooves and the lower track grooves cooperatively define a raceway to receive the lateral stabilization ball bearings.

4. The seat track assembly of claim 3 further comprising at least two ball bearings in each raceway and a retainer positioned in each raceway spacing the ball bearings at a fixed distance from one another.

5. The seat track assembly of claim 4 wherein each retainer is elongate and has a series of openings sized to receive the lateral stabilization ball bearings.

6. The seat track assembly of claim 5 wherein each retainer has 6 openings and each opening receives a lateral stabilization ball bearing.

7. The seat track assembly of claim 3 wherein each upper track groove contacts each ball bearing at two points, and wherein each lower track groove contacts each ball bearing at two points.

8. The seat track assembly of claim 1 further comprising at least two ball bearings positioned between each flange of the lower track and each corresponding side wall of the upper track wherein the at least two ball bearings are spaced apart by a retainer sandwiched between the flange and side wall.

9. The seat track assembly of claim 8 wherein each retainer is a single piece member having at least one opening sized to receive one of the at least two ball bearings.

10. The seat track assembly of claim 1 wherein a J-hook extends from the first and the second side walls of the upper track and the first and second flanges of the lower track extend into the corresponding J-hook permitting longitudinal sliding motion in a normal operating condition, and limiting vertical dislocation of the upper track relative the lower track.

11. The seat track assembly of claim 1 wherein the glide member is elongate and runs substantially the entire length of the upper track.

12. The seat track assembly of claim 1 further comprising U-shaped supports affixed near each end of the lower track, enhancing the rigidity of the lower seat track.

13. The seat track assembly of claim 1 further comprising a positive stop restricting sliding motion of the upper track relative the lower track.

14. The seat track assembly of claim 13 wherein the positive stop comprises first and second projections extending from the upper track and a projection extending from the lower track, wherein the first upper track projection contacts the lower track projection when the upper track slides to a full forward position, and the second upper track projection contacts the lower track projection when the upper track slides to a fill rearward position.

15. The seat track assembly of claim 1 further comprising a latch attached to the upper track and movable from a locking position to a non-locking position releasably, locking the upper track to the lower track when in the locking position.

16. The seat track assembly of claim 15 wherein the lower track has a series of teeth and the latch has a latching member provided with windows sized to receive the teeth and secure the upper track when the latch is in the locking position.

17. The seat track assembly of claim 15 further comprising a manually operable towel bar for moving the latch between the locking position and the non-locking position.

18. The seat track assembly of claim 1 wherein the first and second side walls are generally vertical, the first and second flanges are generally vertical, and the at least one lateral stabilization ball bearing travels in a substantially horizontal raceway defined cooperatively by one of the flanges and one of the side walls and spaced vertically from the top wall.

19. A seat track assembly comprising, in combination:

a fixed track affixable to a motor vehicle, having first and second flanges spaced longitudinally along a top wall, the first and second flanges extending downward from the top wall;

a slidable track affixable to a seat and slidable on the fixed track, having first and second side walls spaced longitudinally along a top wall corresponding to the first and second flanges of the fixed track;

a principal load bearing assembly comprising a low friction contact surface and an elongate plastic glide strip having surface bearing contact with the top wall of the slidable track and extending substantially the entire length of the slidable track and slidable on the contact surface; and a lateral stabilization assembly comprising rolling elements positioned between the first side wall and the first flange and rolling elements positioned between the second side wall and the second flange.

20. The seat track assembly of claim 19 further comprising a low friction coating on the contact surface of the fixed track.

21. The seat track assembly of claim 20 wherein the low friction coating is a paint containing tetrafluoroethene.

22. The seat track assembly of claim 21 further comprising a phosphate pre-coat applied to the fixed seat track before application of the paint to enhance bonding of the paint to the fixed seat track.

23. The seat track assembly of claim 20 wherein the low friction coating has a thickness of about 0.013 to 0.038 millimeters.

24. The seat track assembly of claim 19 wherein the first and second walls of the slidable track have J-shaped portions extending laterally in opposite directions with each J-shaped portion wrapping around the corresponding first and second flanges of the fixed track, wherein the J-shaped portions permit sliding of the slidable track relative the fixed track during normal loading and resist upward dislocation of the slidable track relative the fixed track.

25. The seat track assembly of claim 19 wherein the rolling elements are plastic ball bearings.

26. A motor vehicle seat slidably adjustable from a full forward position to a full rearward position comprising, in combination:

a seat back hingedly attached to a seat base;

a first elongate lower track affixable to a motor vehicle having a pair of contact surfaces;

a first elongate upper track affixed to the seat base at a top wall and having a pair of laterally spaced side walls extending downwardly from the top wall, the upper track being slidable over the lower track;

low friction means for principal bearing of the seat back, seat base and the upper track, comprising an elongate plastic glide strip having surface bearing contact with the top wall of the upper track and being slidable on the contact surfaces of the lower track; and means for enhancing lateral stability of the upper track with respect to the lower track, positioned remote from the contact surfaces and comprising a first pair of lateral stabilization balls secured together by a first retainer positioned between one of the side walls of the upper track and a corresponding one of the side walls of the lower track, and a second pair of lateral stabilization balls secured together by a second retainer positioned between another of the side walls of the upper track and a corresponding second one of the side walls of the lower track.

27. The motor vehicle seat of claim 26 wherein the seat base comprises a seat cushion and a riser, and the upper track is affixed to the riser.

28. The motor vehicle seat of claim 26 further comprising a latch attached to the upper track and movable from a locking position engaging the lower track to secure the upper track to the lower track to a non-locking position allowing the upper track to slide relative the lower track.

29. The motor vehicle seat of claim 28 further comprising a spring biasing the upper track to the full forward position when the latch is disengaged from the lower track.

30. The motor vehicle seat of claim 26 further comprising a second lower track spaced laterally from the first lower track and a second elongate upper track affixed to the seat base and slidable on the second lower track.

31. The motor vehicle seat of claim 30 wherein the second lower track is substantially identical to the first lower track.

32. The seat track assembly of claim 1 further comprising a low friction coating on the primary load bearing elongate contact surface, wherein the glide member slides directly on the low friction coating.

33. The seat track assembly of claim 1 wherein the glide member is sandwiched between the contact surface and a lower side of the top wall of the upper track.

34. A seat track assembly for slidably adjusting a seat, comprising, in combination:

an upper track having an elongate bearing top wall and first and second laterally spaced side walls extending along and downwardly from the top wall;

a lower track having a low friction coating on a pair of primary load bearing, elongate contact surfaces and a first flange and a second flange positioned adjacent the contact surfaces;

at least one lateral stabilization ball bearing positioned between the first flange of the lower track and the first side wall of the upper track, and at least one lateral stabilization ball bearing positioned between the second flange of the lower track and the second side wall of the upper track, the lateral stabilization ball bearings being positioned remote from the contact surfaces; and a glide member having surface bearing contact with the top wall of the upper track and slidably bearing on the contact surfaces of the lower track.

35. A seat track assembly for slidably adjusting a seat, comprising, in combination:

an upper track having an elongate bearing top wall having a bottom surface and first and second laterally spaced side walls;

a lower track comprising a bottom wall having a top surface, first and second interior walls extending from the bottom wall and cooperating with the bottom wall to define a central cavity, a pair of primary load bearing walls each having an elongate contact surface external of the central cavity and generally parallel with the bottom wall, and a first flange and a second flange each extending from a corresponding contact surface;

at least one lateral stabilization ball bearing positioned between the first flange of the lower track and the first side wall of the upper track, and at least one lateral stabilization ball bearing positioned between the second flange of the lower track and the second wall of the upper track, the lateral stabilization ball bearings being positioned outside of the central cavity; and a glide member having a thickness and a bottom surface, slidably bearing on the contact surface of the lower track; wherein the central cavity has a height equal to a distance between the top surface of the bottom wall and the bottom surface of the top wall, and a distance between the top surface of the bottom wall and the bottom surface of the glide strip equals the height of the central cavity less the thickness of the glide strip.

* * * * *